July 12, 1932.  J. C. CROWLEY  1,867,253
AIR CHUCK
Filed March 16, 1929
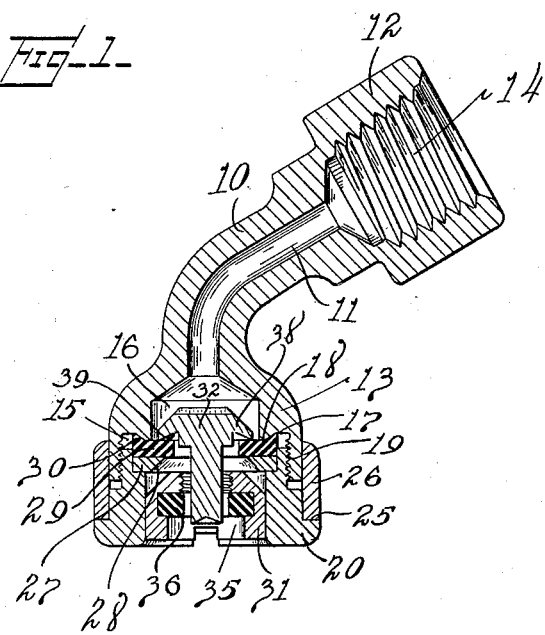
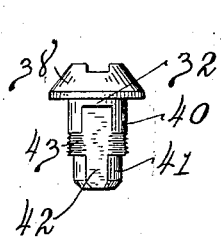 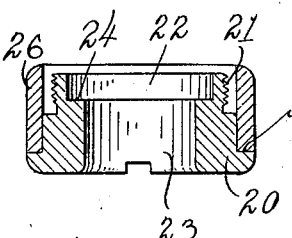 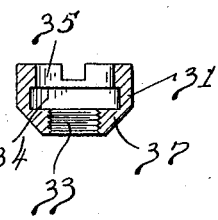
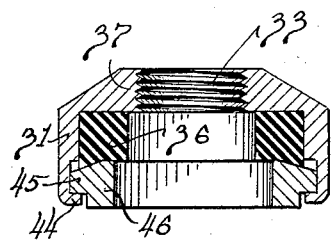
Inventor
John C. Crowley
Kwis Hudson & Kent
Attys Patented July 12, 1932

1,867,253

UNITED STATES PATENT OFFICE

JOHN C. CROWLEY, OF CLEVELAND HEIGHTS, OHIO, ASSIGNOR TO THE DILL MANUFACTURING COMPANY, OF CLEVELAND, OHIO, A CORPORATION OF OHIO

AIR CHUCK

Application filed March 16, 1929. Serial No. 347,468.

This invention relates to an air chuck particularly adapted to be used with an air hose for inflating rubber articles such as pneumatic tires, although, of course, not limited to this use.

Air chucks are commonly employed in connection with air pressure systems in garages, service stations, and similar places and since they are subjected to severe treatment and usage it is necessary that they be strongly constructed and not easily broken or rendered inoperative. It is also necessary that the chuck be provided with an efficient valve for preventing the escape of air from the hose line when the device is not in use and that such valve be readily responsive to movement from its seat when the device is applied to a valve stem.

An object of the invention is to provide an air chuck of simple construction, formed of a relatively few number of parts, and of such strength that it will easily withstand the treatment to which it is subjected in every day use.

Another object is to provide an air chuck in which an efficient valve is arranged, capable of preventing the escape of air from the hose line when the chuck is not in use, yet readily responsive to be unseated when it is desired to connect the chuck to a valve stem.

Additional objects and advantages will become apparent as the description proceeds.

An embodiment of the invention is illustrated in the accompanying drawing wherein Figure 1 is a sectional view through the air chuck;

Figs. 2, 3 and 4 are detail views of the valve, the chuck nut, and the plunger respectively, the last two parts being shown in section; and Fig. 5 is a detail view of a modified form of the plunger.

The chuck comprises an elbow portion 10 having an air passage 11 therethrough and provided at its opposite ends with a hose connecting portion 12 and a valve housing portion 13. The air passage 11 connects the hose attaching portion 12 and the valve housing portion 13, the former portion being provided with an enlarged tapped opening 14 adapted to threadedly receive a cooperating threaded portion of the air hose. The valve housing portion 13 constitutes a chambered head, the chamber of which is formed of a pair of recesses of different diameter, the outer recess 15 being substantially larger than the inner recess 16. An internal flange 17 at the junction of the two recesses 15 and 16 is provided with a downwardly extending pointed annular rib 18 while the wall of the recess 15 is internally threaded at 19 so that a nut 20 externally threaded at 21 may be threadedly connected to the portion 13. The upper threaded portion of the nut 20 is reduced in diameter and provided with an annular recess 22 communicating with a smaller recess 23 and having an annular shoulder 24 at its base. The outer end of the nut 20 is enlarged and is provided with an outwardly extending annular shoulder 25 upon which a ferrule 26, shrunk or otherwise arranged upon the nut, may seat. This ferrule 26 extends upwardly beyond the upper end of the nut and is spaced outwardly from the threaded portion 21 thereof whereby when the nut is assembled with the valve housing portion 13 of the chuck the wall of the recess 15 will extend between the ferrule and the nut with the internal threads 19 thereof mating with the external threads 21 of the nut.

A metal spacer 27 is arranged upon the shoulder 24 of the recess or counterbore 22 of the nut, which spacer is provided with a central opening, the wall 28 of which is inwardly and upwardly inclined or tapered. Supported upon the spacer 27 is a flexible member 29 such as a rubber gasket, which member has an upwardly extending peripheral rib 30 adapted when the parts are assembled to be compressed into cooperating relation with the outer side of the rib 18 of the housing portion 13 to thereby form an air-tight connection between the parts. The member 29 is provided with a central opening smaller than the opening in the spacer 27 and through which the valve projects as will later be described.

In reality the valve comprises two members, the member 31 being the plunger, while the member 32 is the valve proper. The plunger 31 fits within the recess or counterbore 23 of the nut 20 and is provided at the end which is adapted to be arranged inwardly of the nut with a centrally arranged tapped opening 33 communicating with a larger counterbore 34, which in turn communicates with a smaller counterbore 35 adjacent the outer end of the plunger. The counterbore 34 has a flexible washer 36 arranged therein, which washer is provided with an opening aligning with the tapped bore 33 in the plunger.

As previously stated the plunger is arranged within the counterbore 23 of the nut 20, the tapped bore 33 of the plunger being arranged inwardly thereof and since the plunger is adapted to have movement in the counterbore its inner peripheral edge is formed with an inward or tapered slope indicated at 37, corresponding to the wall 28 of the spacer 27 so that the plunger, as it moves upwardly in the counterbore 23, can be accommodated in the opening in the spacer 27.

The valve 32 has a head, provided with a flange 38, extending outwardly and downwardly and providing on its underside a substantially V-shaped groove 39. Projecting from the head is a stem, the upper portion 40 of which is larger than the lower portion 41. The valve is arranged with the head thereof inwardly of the gasket 29 so that the narrow under edge of outwardly extending flange portion 38 thereof will rest upon the member 29 which forms a valve seat, while the enlarged portion 40 of the stem is externally threaded at 43 and is adapted to be screwed in the tapped bore 33 of the plunger, thus uniting the valve and the plunger into a single operative element.

When the chuck is attached to the hose of an air pressure system and is not in use the pressure of the system against the relatively large valve head will cause the valve to seat and thus efficiently prevent the escape of air from the system since the formation of the flange portion 38 thereof and the groove 39 is such that the head of the valve engages the member 29 along a knife-like edge spaced substantially inwardly of the opening in the member. When the chuck is applied to a valve stem the upper end of the stem will pass into the counterbore 35 of the plunger and will engage against the flexible washer 36 and move said plunger, together with the valve, upwardly within the valve housing portion. Since a slight movement is sufficient to lift the valve from its seat air may pass from the pressure system into the article being inflated because of the spaces provided by the flats 42 formed on the stem of the valve and extending above the threaded portion 43 thereof.

It will thus be seen that while providing an efficient valve, it has been possible to eliminate the necessity of a spring to seat the valve and that all of the parts are ruggedly constructed and capable of withstanding constant and rough usage.

A modified form of plunger is illustrated in Fig. 5, wherein the plunger 31 has an inturned portion 44 engaging beneath a flange 45 of a retaining ring 46 for the flexible washer 36, thus preventing wear on the washer.

Although a preferred embodiment of the invention has been illustrated and described it should be understood that the same is susceptible of various modifications and adaptations within the scope of the appended claims.

Having thus described my invention, I claim:

1. An air chuck comprising a member provided with a chambered head, a second member secured to the head of said first member and having an axial opening therethrough communicating with the said chambered head, means in said chambered head and restricting the opening in said second named member, a valve cooperating with said means and having a head arranged in said chamber on one side of said means and a plunger associated with said head and arranged in the opening in the second named member on the other side of said means and comprising a plunger stem extending from said head through said means into the opening in said second named member, and a plunger member having a sliding fit within said opening, said plunger stem being provided with longitudinally extending flats and with a threaded portion and said plunger member having an opening provided with threads cooperating with the threaded portion of said stem to secure the said stem and plunger member together.

2. An air chuck comprising a member provided with a chambered head, a second member secured to the head of said first member and having an axial opening communicating with said chambered head, said chambered head being provided with an inwardly extending flange, a packing held in said chambered head between said members and having a portion cooperating with said flange to form an air-tight connection, a valve having a head arranged in said chamber on one side of said packing and provided with an outwardly and downwardly extending flange having a narrow under edge which seats on said packing, a plunger associated with said valve and arranged in the opening in the second member on the other side of said packing and comprising a plunger stem extending from said head through said packing into the opening in said second named member and a plunger member having a sliding fit within the opening in said second named member, said plunger stem being provided with longitudinally extending flats and having a threaded portion, and said plunger member being provided with a threaded opening cooperating with the threaded portion of the stem to secure the stem and plunger member together and with a counterbore in which is arranged a gasket.

In testimony whereof, I hereunto affix my signature.

JOHN C. CROWLEY.